United States Patent [19]
Eisenmann

[11] 3,856,278
[45] Dec. 24, 1974

[54] TWIN-SCREW EXTRUDER WITH ADJUSTABLE THROTTLING MEANS

[75] Inventor: Gerhard Eisenmann, Senden, Germany

[73] Assignee: Werner & Pfleiderer, Stuttgart, Germany

[22] Filed: Oct. 2, 1973

[21] Appl. No.: 402,711

[30] Foreign Application Priority Data
Oct. 7, 1972 Germany............................ 2249328

[52] U.S. Cl.................................. 259/192, 425/209
[51] Int. Cl............................. B29f 3/02, B01f 7/08
[58] Field of Search............ 259/192, 191, 193, 104, 259/6, 21, 41; 425/380, 204, 200, 209

[56] References Cited
UNITED STATES PATENTS

| | | | |
|---|---|---|---|
| 2,970,341 | 2/1961 | Mallory | 425/380 |
| 3,572,644 | 3/1971 | Poncet | 259/6 |
| 3,704,866 | 12/1972 | Mosher | 259/192 |
| 3,764,114 | 10/1973 | Ocker | 259/192 |
| 3,764,118 | 10/1973 | Matsuoka | 259/192 |
| 3,802,670 | 4/1974 | Okada | 259/192 |

*Primary Examiner*—Robert W. Jenkins
*Attorney, Agent, or Firm*—Hane, Baxley & Spiecens

[57] ABSTRACT

There is disclosed a twin-screw extruder for processing pulverized and pasty material. The extruder comprises an elongate housing with a feed opening at one end and a discharge opening at the other end. The two screws are rotatably mounted in the housing for conveying the material to be processed from the feed end to the discharge end. Each of the screws includes screw flights which are pitched to convey the material in opposite direction, that is, in the upstream direction. The downstream conveyance of the material is controlled by a displaceable slide, the position of which relative to the screw flights controls the flow of material through the extruder housing and thus the pressure build up in the extruder and the required power input whereby the operational conditions in the extruder can be accurately adjusted for the specific properties of the material to be processed.

10 Claims, 5 Drawing Figures

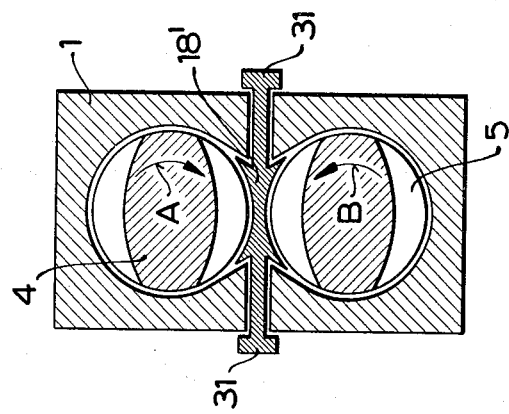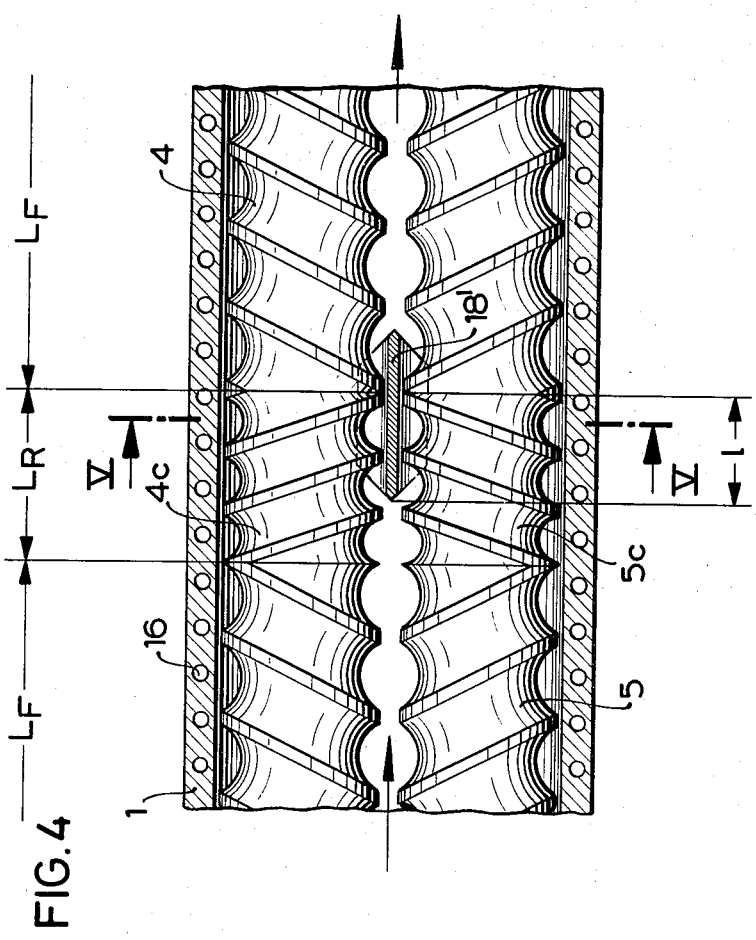

TWIN-SCREW EXTRUDER WITH ADJUSTABLE THROTTLING MEANS

The invention relates to a twin-screw extruder the housing of which has a feed opening at one end and a discharge opening at the other end, and more particularly, to a twin-screw extruder the screws of which include at least one section with screw flights pitched for upstream conveyance of the material to be processed in the extruder.

BACKGROUND

Twin-screw extruders of the general kind above referred to are widely used in the chemical industry for processing synthetic plastic masses of pulverized or pasty consistency, and also in the rubber processing industry for producing mixtures of caoutchouc and other starting materials. The extruders used for this purpose as now known comprise a throttling device with which the power input required by the mass to be processed can be regulated. This power input, in addition to the r.p.m. of the screws and the temperature in the different zones of the extruder housing, is one of the physical magnitudes which are variable during the operation for controlling the characteristics of the products to be obtained. Such throttling device also permits regulation of the output of the extruder. Normally, the pressure existing in the extruder and the output affect each other.

There are known single-screw extruders in which the pressure regulation is effected by the coaction of an annular groove in the inner housing wall and an annular flange on the shaft of the screw. Such pressure regulating is shown for instance in U.S. Pat. No. 2,970,341. The groove and the flange are used to effect either a displacement of the screw or of the housing itself via a bushing in the housing. A disadvantage of such extruders is that if a strong throttling is to be used, a very narrow shear gap in the extruder must be provided and such narrow shear gap may adversely affect the material to be processed. Moreover, the shear gap cannot be finely regulated when strong throttling is required as the accuracy of the control is sensitive to changes in length, as they are bound to occur due to temperature expansion or contraction either at the housing or at the screw shaft. A displacement of the housing or of the entire screw entails rather complex and accordingly expansive installations.

According to another known twin-screw extruder, as is known for instance from published German Application 1,175,868, the pressure in a melt of synthetic plastic material is controlled by a piston which is movable in the direction normal to the two screw shafts. In this extruder, the screws have flights pitched for conveyance in the upstream direction within the operational range of the piston. With such an arrangement a small change in the setting of the piston results in a large change in the flow passage for the material, and thus in the pressure in the extruder and in the output thereof. As a result, a fine regulation of the operation becomes very difficult.

THE INVENTION

It is a broad object of the invention to provide a novel and improved twin-screw extruder including a throttling device with which the effective pressure within the extruder and thus also the power input required for the synthetic plastic or other material to be processed can be finely regulated.

A more specific object of the invention is to provide a novel and improved twin-screw extruder which permits a fine regulation of the pressure even if the throttling device is set for high throttling of the flow of material through the extruder without danger of deterioration of the material to be processed and without the difficulties encountered with twin-extruders as hereinbefore referred to.

SUMMARY OF THE INVENTION

The aforepointed out objects, features and advantages, and other objects, features and advantages which will be pointed out hereinafter are obtained by an adjustable throttling device which includes screw flights in the screws of the extruders that are pitched in opposition to the screw flights for conveying the material to be processed from the feed end of the extruder toward the discharge end thereof. In other words, these oppositely pitched screw flights convey the material in upstream direction. The throttling device further provides an elongate member which is lengthwise slidable relative to the location of the oppositely pitched screw flights thereby correspondingly throttling the flow passage for the material to be processed.

According to another aspect of the invention, fine and broad range control of the pressure applied to a melt of synthetic plastic material or other material to be processed is obtained by shaping the slidable member so that its cross-sectional outline in a plane normal to the length axis of the extruder has approximately edges in the form of a double wedge and arcuate sides facing the screws, the curvature of these sides being concave relative to the screws.

To effect setting of the slidable member relative to the oppositely pitched screw flights, the invention provides means for effecting such displacement from the outside of the extruder housing. In the zones in which a high pressure is present, it is difficult to seal off the passages for the slidable member through the housing. According to a further aspect of the invention, sealing is obtained in a simple manner by arranging the oppositely pitched screw flights and the slidable member adjacent to the discharge end of the extruder housing and by extending the member through the end wall of the housing at the discharge end thereof. The protruding part of the slidable member can be in a simple and efficient manner coupled to a suitable setting device such as a conventional cylinder-piston hydraulic or other servo system. An arrangement of this kind also permits an effective and accurate control of the output of the extruder.

If it be desirable that the pressure and the power input are controlled well upstream of the discharge opening or even close to the feed in zone, and the pressures involved are not very high, the invention provides that the slidable member is displaceable crosswise of the lengthwise axis of the extruder housing through slots in the side wall of the housing.

Among the advantages of the invention as will be more fully described in the subsequent description is that by selecting the r.p.m. of the screws and the power input, the operational conditions required for the desired product quality can be readily obtained. Such setting can be very sensitively and accurately effected without difficulty. Moreover, the control or regulation can be effected within a wide range without causing damage to the material to be processed as is likely to occur due to a narrow shear plate. As it is well known, the application of an excessive pressure to the material may damage the same and may also cause a temperature elevation resulting in a deterioration of the material.

The invention also provides that the output of the extruder can be controlled while maintaining substantially constant the r.p.m. of the screws.

Finally, the setting device according to the invention can be easily controlled from the outside of the extruder by very simple and conventional control means.

BRIEF DESCRIPTION OF THE DRAWING

In the accompanying drawing several preferred embodiments of the invention are shown by way of illustration and not by way of limitation.

In the drawing:

FIG. 4 is a fragmentary lengthwise sectional view of a modification of the extruder according to the invention; and FIG. 5 is a section taken on line V—V of FIG. 4 turned through 90°.

DETAILED DESCRIPTION OF THE DRAWING

Figure 1:
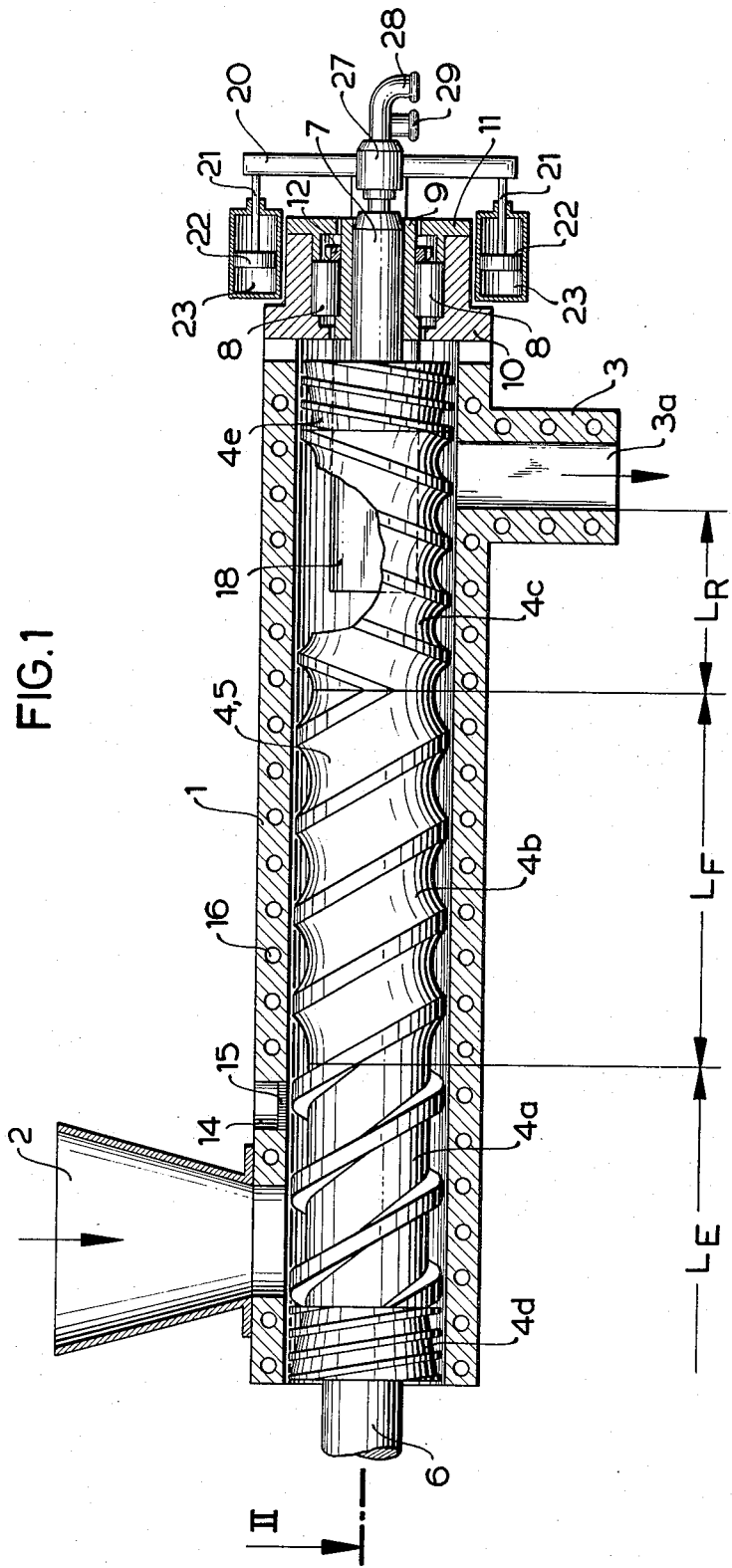
FIG. 1 is a diagrammatic lengthwise sectional view of a twin-screw extruder according to the invention.

Referring now to the figures in greater detail, FIG. 1 shows an exemplification of a twin-screw extruder comprising an elongate housing 1 which has at one end a feed hopper 2 and at the other end a duct 3 including a discharge opening 3a. The housing has rotatably mounted therein two screws 4 and 5 in parallel coacting relationship. The screws provide a feed-in zone 4a, a processing zone 4b and a regulation and discharge zone 4c. There is further provided a short zone 4d disposed adjacent to the feed end of the screws and including screw flights having a low pitch and being shallow. A similar zone 4e is provided at the discharge end of the housing. Both zones 4d and 4e feed material toward the housing space therebetween, that is, zone 4d conveys material in the downstream direction and zone 4e in the upstream direction. These zones serve to seal off the passage openings for passage of trunions 6 and 7 of the screw shafts through the housing. Trunion 6 is connected to a drive motor and a gearing in a conventional arrangement (not shown) and trunion 7 serves for journaling the screw shafts at the discharge end of the extruder. There are provided for the purpose roller bearings 8 which rotate between an inner bushing 9 slid upon trunion 7 at an outer bearing housing 10. A cover 11 closes the bearing and a nut 12 secures roller bearing 8 in its axial position.

A degasing port 14 is provided adjacent to feed hopper 2, a sieve 15 being preferably provided in port 14.

Ducts 16 in the wall of housing 1 are provided for circulating a heating medium or a coolant. Normally, the housing is cooled in its feed-in zone while the other zones in the housing are more or less heated, depending upon the specific properties of the material to be processed in the extruder.

FIG. 1 shows in dotted lines a slidable member 18 which is displaceable in the lengthwise direction of the screws. This slide serves to throttle the flow of material to be processed and also to control the pressure acting upon the flow of the material, and thus the power input. The structure and the function of the slide will be more fully described hereinafter. The slide has an extension protruding from the end wall at the discharge end of the housing. This protruding slide part is secured to a cross bar 20 which in turn supports two piston rods 21 mounting pistons 22, displaceable in hydraulic cylinders 23. By applying a pressure medium to either side of the pistons the axial positions of slide 18 may be regulated as required.

The shafts of screws 4 and 5 can also be heated or cooled as required. Such heating or cooling is effected by means of rotary connector heads 27 which in turn are connected to feed and discharge conduits 28 and 29 respectively. These conduits should be visualized as leading to a supply for a suitable heating or cooling medium.

Figure 2:
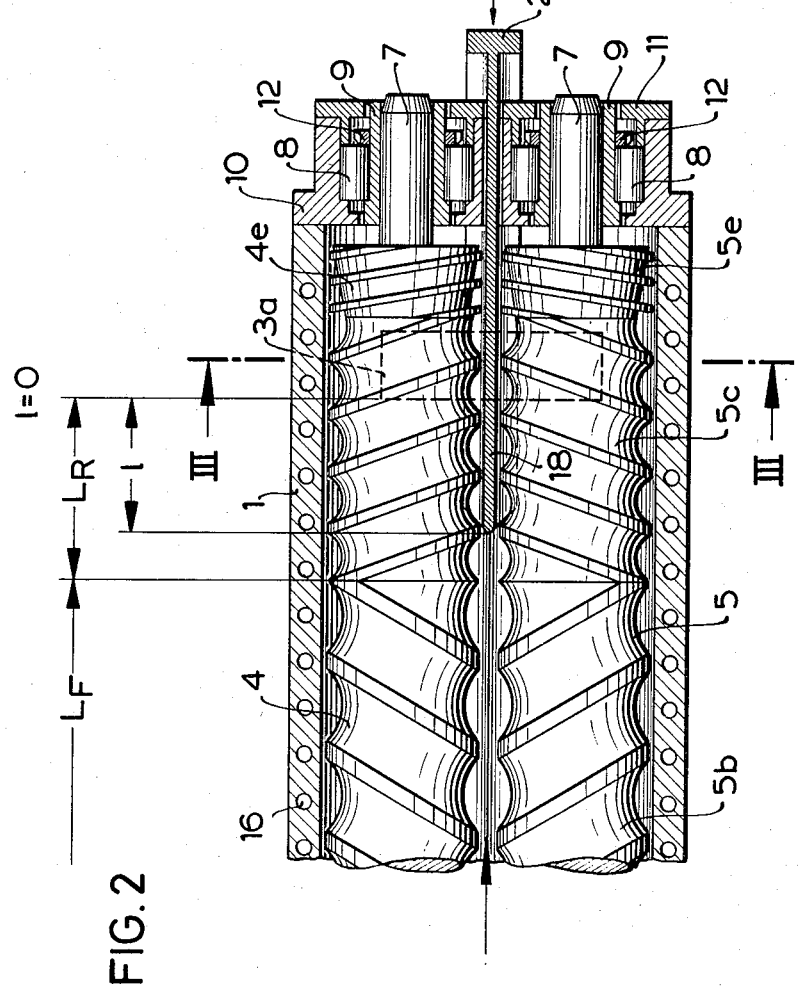
FIG. 2 is a fragmentary sectional plan view of FIG. 1.

The length of feed-in zone $L_E$, the conveying and processing zone $L_F$ and the back conveying regulating and discharge zone $L_R$ are indicated by arrows. Details to effect displacement of slide 18 and as to the functions of the slide are shown in detail in FIGS. 2 and 3. The axial position of slide 18 as shown in FIG. 2 is indicated by the distance 1 between the inner or left-hand end of the slide and the respective edge of discharge opening 3a. Accordingly, the slide is in its left-hand end position, that is, when $1 = L_R$ bridges the entire range of the back conveying flights of the extruder screws. Hence, the throttling action and the pressure build up in the extruder are at a maximum. In the right-hand end position, that is when $1 = 0$, the slide is pushed as far as possible out of the range of the back conveying screw flights, that is, the material to be processed such as a melted mass of synthetic plastic can flow at low pressure through the gap between the two screws and reach the discharge duct 3. Accordingly, the throttle action, the pressure build up and thus the required power input are at a minimum in the right-hand end position of the slide. As it is now evident, by placing the slide in selected intermediate positions, the pressure in the extruder can be accurately and highly sensitively regulated since there is a practically linear proportional relationship between the slide position and the magnitude of the pressure build up.

Figure 3:
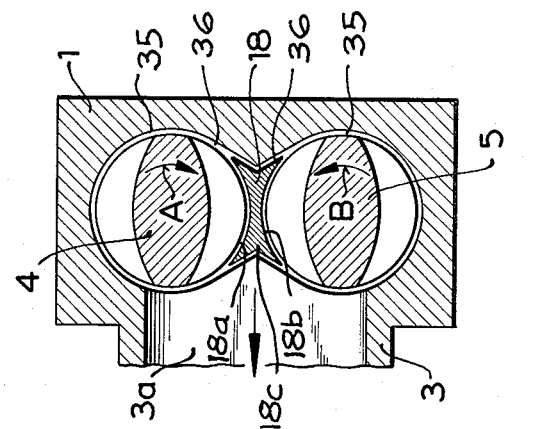
FIG. 3 is a sectional view taken on line III—III of the extruder according to FIG. 2 and turned through 90°.

FIG. 3 shows in detail the discharge duct 3 and the flow discharge opening 3a as formed by the duct; the rotational directions of the two screws 4 and 5 being indicated by arrows A and B. FIG. 3 also shows that the inner cross-sectional outline for the two screws, the spaces being open on the sides at which the two screws face each other. The circularly curved wall portions within the housing are joined by straight wall portions 36 meeting at an angle. FIG. 3 further shows that slide 18 has a cross-sectional outline so that the two sides 18a and 18b are concavely curved relative to the screws and that the lengthwise edges 18c of the slide are shaped to match the straight side wall portions 36 of the housing. Accordingly, the slide substantially fills the gap between the two screws along the effective length of the slide.

Referring now to FIGS. 4 and 5, the twin-screw extruder as exemplified in these figures is similar in principle to that shown in FIGS. 1, 2 and 3, except that the back conveying or oppositely pitched screw flights 4c and 5c are not disposed in juxtaposition to discharge opening 3a, that is, at the downstream end of the forwardly conveying flights, but are interposed between flights conveying the material in downstream direction. Slide 18' has two extensions 31, which protrude from the housing through lengthwise slots 32 in the side wall of the housing. Accordingly, slide 18' of FIGS. 4 and 5 is slidable crosswise relative to the housing rather than lengthwise, as is slide 18. The setting of the slide is effected by suitable and conventional setting means which are not shown.

The arrangement according to FIGS. 4 and 5 is particularly advantageous when it is desirable to throttle the flow of material at a point upstream of the discharge opening of the extruder. Depending upon the location of the throttling means, in particular when they are close to or in the feed-in zone, the slide 18' can be used to control the output of the extruder.

The pressure on the material in the range of the throttling action should not be very high as a high pressure of material within the range of the throttling action may make the sealing off of the passage of the extensions 31 of slide 18' through the wall of the housing difficult or at least expensive. With the structure according to FIGS. 1–3, this difficulty does not exist as the passages for trunions 6 and 7 and also the passage for slide 18 through the respective end wall of the housing are held practically free of pressures by the screw flights causing the downstream conveying of the material within the housing. As it is evident, this constitutes a very significant structural advantage of the extruder arrangement according to FIGS. 1 to 3.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A twin-screw extruder for processing pulverized and pasty material, said extruder comprising:

an elongate housing having at one end a feed opening and at the other end a discharge opening;

a pair of coacting parallel screws rotatably mounted in the housing for conveying material to be processed in the direction from the feed opening toward the discharge opening, said screws being separated by a lengthwise gap and each of said screws including screw flights pitched for conveying the material in said downstream direction and screw flights pitched to convey the material in opposition to the downstream direction; and adjustable throttling means for controlling the downstream conveyance of material through the housing, said throttling means including an elongate slidable member interposed in the gap between said oppositely pitched screw flights, said slidable member being lengthwise displaceable relative to said oppositely pitched screw flights.

2. The screw extruder according to claim 1 wherein the cross-sectional outline of said slidable member in a plane normal to the lengthwise axis of said housing defines two arcuate surfaces each facing one of the screws concavely relative thereo.

3. The screw extruder according to claim 2 wherein said oppositely pitched screw flights are juxtaposed to said discharge opening in the housing and said slidable member is displaceable into positions covering selected parts of said opening and said oppositely pitched screw flights.

4. The screw extruder according to claim 3 wherein said housing has an inner cross-sectional outline defining for each screw a lengthwise space of circular outline, said spaces being joined at the side at which the two screws face each other so as to provide a lengthwise gap between the screws, said slidable member being accommodated within said gap, the crosswise width of the slidable member substantially matching the crosswise width of the gap thereby substantially closing the same along the length of said member.

5. The screw extruder according to claim 4 wherein wall portions within the housing defining the gap are straight wall portions meeting at an angle, the surfaces of the slidable member facing said straight wall portions being shaped to match the configuration of said straight wall portions.

6. The screw extruder according to claim 1 wherein said slidable member protrudes from the housing at the discharge end thereof, and wherein setting means accessible at the outside of the housing are coupled to the protruding member part for lengthwise displacement of the member relative to the screw flights.

7. The screw extruder according to claim 1 wherein said slidable member is displaceable crosswise of the length of the housing and said housing has in its side wall lengthwise elongate slots for passage of the member and displacing the same.

8. The screw extruder according to claim 7 wherein the cross-sectional outline of said slidable member in a plane normal to the lengthwise axis of said housing defines two arcuate surfaces each facing one of the screws concavely relative thereto, the side edges of said slidable member substantially matching the juxtaposed inner housing wall portions.

9. The screw extruder according to claim 1 wherein said oppositely pitched screw flights are disposed opposite said discharge opening, said slidable member being displaceable between a throttling position fully covering said opening and a position fully uncovering said opening.

10. The screw extruder according to claim 1 wherein oppositely pitched screw flights and said slidable member are disposed intermediate the feed-in opening and the discharge opening, said displaceable member being displaceable into and out of position interposed between the opposite pitched screw flights on the two screws.

* * * * *